United States Patent
Hiasa

(10) Patent No.: US 9,773,296 B2
(45) Date of Patent: Sep. 26, 2017

(54) IMAGE PROCESSING DEVICE AND SYSTEM, IMAGE PROCESSING METHOD, AND MEDIUM

(71) Applicant: CANON KABUSHIKI KAISHA, Tokyo (JP)

(72) Inventor: Norihito Hiasa, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 198 days.

(21) Appl. No.: 14/674,492

(22) Filed: Mar. 31, 2015

(65) Prior Publication Data

US 2015/0287171 A1   Oct. 8, 2015

(30) Foreign Application Priority Data

Apr. 4, 2014   (JP) .................................. 2014-077677

(51) Int. Cl.
*G06T 5/00* (2006.01)
*G06T 3/00* (2006.01)
*G06T 5/20* (2006.01)

(52) U.S. Cl.
CPC ............ *G06T 5/002* (2013.01); *G06T 3/0056* (2013.01); *G06T 5/20* (2013.01)

(58) Field of Classification Search
CPC .......... G06T 5/002; G06T 5/20; G06T 3/0056
USPC ....................................................... 382/195
See application file for complete search history.

(56) References Cited

U.S. PATENT DOCUMENTS

| | | | |
|---|---|---|---|
| 2008/0181523 A1* | 7/2008 | Yoo | G06T 5/002 382/254 |
| 2008/0319317 A1* | 12/2008 | Kamiyama | A61B 8/0825 600/443 |
| 2010/0141804 A1 | 6/2010 | Morel et al. | |
| 2013/0265396 A1* | 10/2013 | Surma | H04N 13/0239 348/47 |

FOREIGN PATENT DOCUMENTS

JP   2007536662 A   12/2007

* cited by examiner

*Primary Examiner* — Amandeep Saini
(74) *Attorney, Agent, or Firm* — Rossi, Kimms & McDowell LLP

(57) ABSTRACT

The present invention is directed to an image processing device including: a unit configured to extract, as target data, a set of signal values of pixels included in a target region including a target pixel in an input image; a unit configured to obtain reference data for each of a plurality of reference pixels corresponding to the target pixel; a unit configured to generate transformation reference data by transforming the reference data; a unit configured to determine a weight for each of a plurality of transformation reference pixels based on the target data and the reference data; and a unit configured to generate an output pixel corresponding to the target pixel by using a signal value calculated based on the transformation reference pixels and the weights.

14 Claims, 13 Drawing Sheets

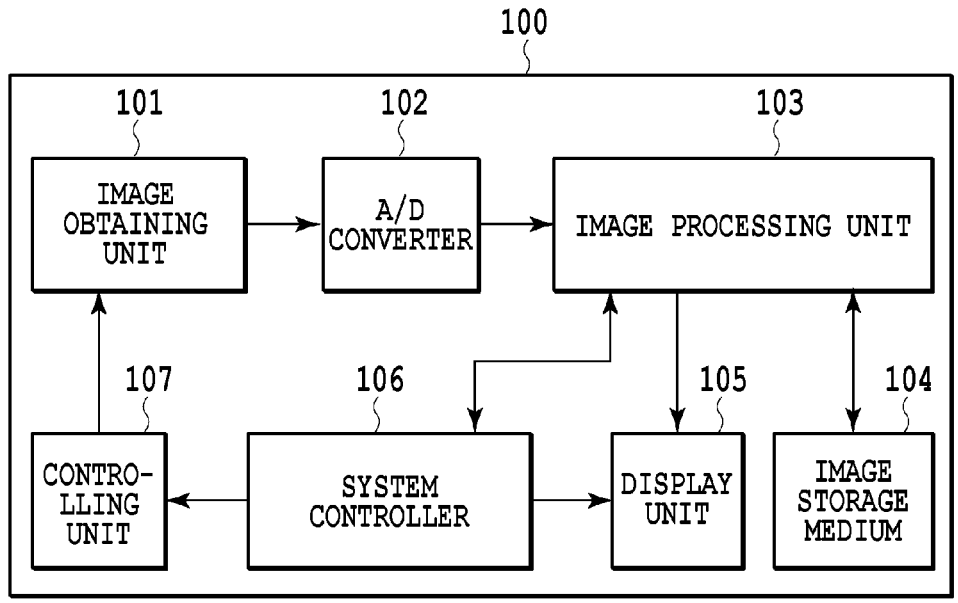
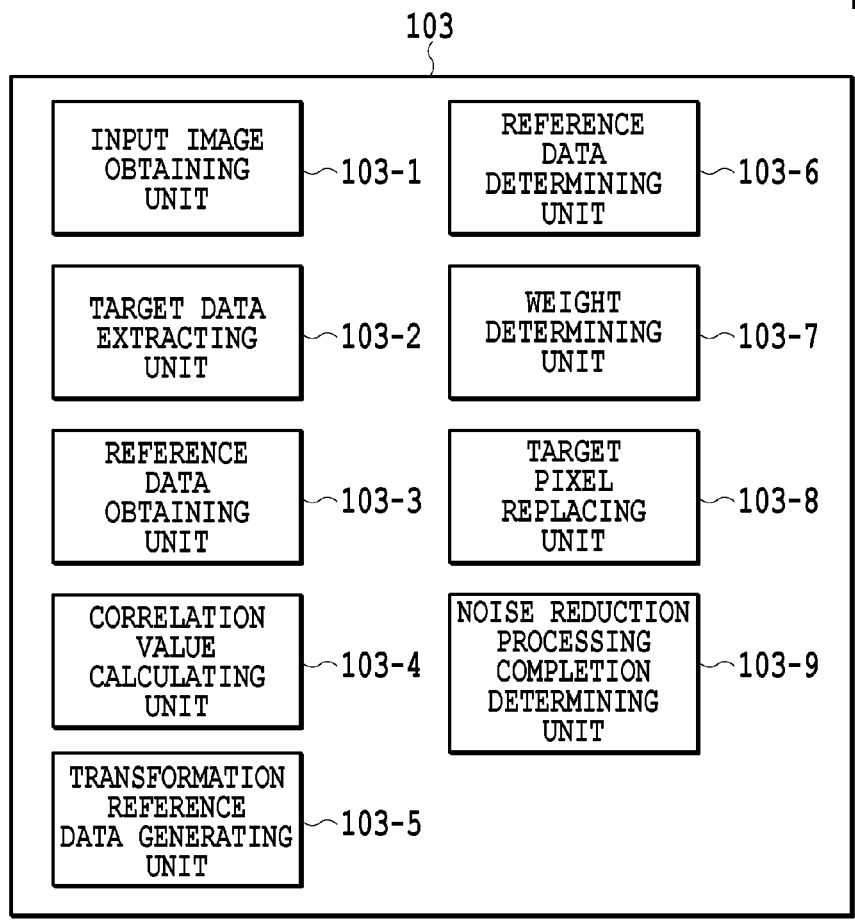
FIG.1A
FIG.1B

US 9,773,296 B2

IMAGE PROCESSING DEVICE AND SYSTEM, IMAGE PROCESSING METHOD, AND MEDIUM

BACKGROUND OF THE INVENTION

Field of the Invention

The present invention relates to an image processing device and system, an image processing method, and a medium. More specifically, the present invention relates to an image processing device and system, an image processing method, and a medium for performing noise reduction on an image.

Description of the Related Art

In recent years, the definition of a display device becomes higher, and higher image quality is desired. In order to achieve higher image quality, it is important to reduce noise in an image.

Japanese Patent Laid-Open No. 2007-536662 proposes a noise reduction method called a nonlocal means (NL-means) filter and using the self-similarity of subject space. The NL-means filter is a method in which noise is reduced by replacing the signal value of a target pixel with the weighted average signal value of a plurality of pixels around the target pixel. On this occasion, weights used for the weighted average are determined according to distances between a vector which includes, as a component, each signal value of a partial region with the target pixel at a center and vectors which are generated from pixels around the target pixel in a similar manner.

SUMMARY OF THE INVENTION

In the method disclosed in Japanese Patent Laid-Open No. 2007-536662, the effect of noise reduction is achieved by using the weighted average of the plurality of pixels. In this noise reduction, as the number of pixels used for the weighted average becomes larger, the effect of noise reduction becomes larger. However, there is a problem that as the number of pixels becomes larger, the number of times of calculating a distance between vectors becomes larger, and a calculation load becomes larger.

In view of this problem, the present invention has been made. An object of the present invention is to provide an image processing device having the large effect of noise reduction while suppressing an increase in calculation load.

In an aspect of the present invention, there is provided an image processing device comprising: a target data extracting unit configured to extract, as target data, a set of signal values of pixels included in a target region including a target pixel in an input image; a reference data obtaining unit configured to obtain, as reference data for each of a plurality of reference pixels corresponding to the target pixel, a set of signal values of pixels included in a reference region including the reference pixel; a transformation reference data generating unit configured to generate transformation reference data from the reference data and output a plurality of signal values of transformation reference pixels which the generated transformation reference data has; a weight determining unit configured to determine a weight for each of the plurality of transformation reference pixels based on the target data and the reference data; and a unit configured to generate an output pixel corresponding to the target pixel by using a signal value calculated based on the transformation reference pixels and the weights, wherein the transformation reference data generating unit generates the transformation reference data by transforming the reference data in which a number of the pixels included in the reference region is larger than a number of the pixels included in the target region based on the number of the pixels included in the target region and the number of the pixels included in the reference region.

The present invention can provide an image processing device having the large effect of noise reduction while suppressing an increase in calculation load.

Further features of the present invention will become apparent from the following description of exemplary embodiments (with reference to the attached drawings).

BRIEF DESCRIPTION OF THE DRAWINGS

FIGS. 1A and 1B are block diagrams showing the configuration of an imaging device of Embodiment 1;

DESCRIPTION OF THE EMBODIMENTS

Figure 2:
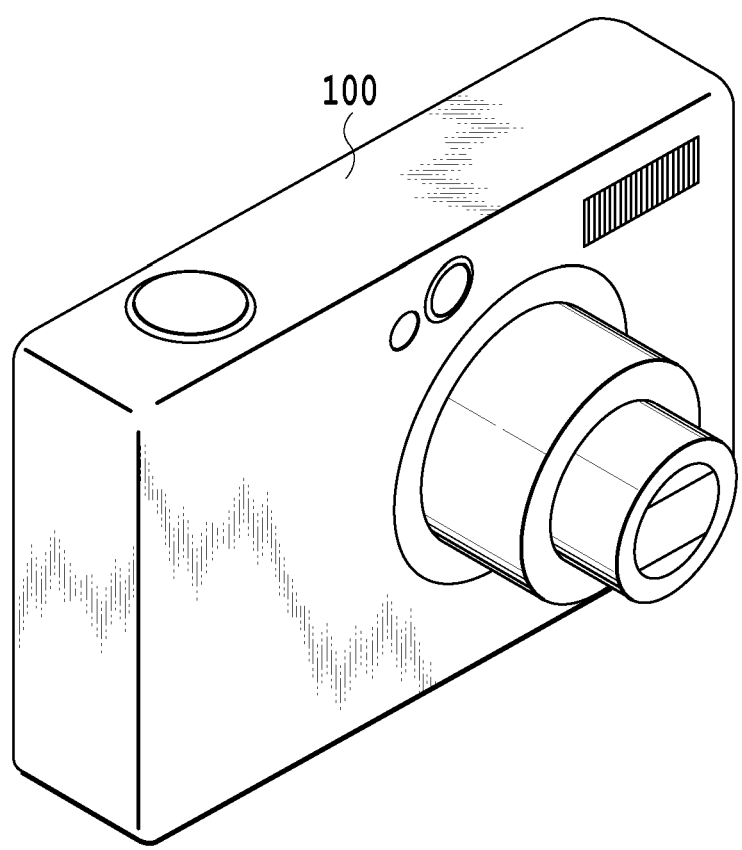
FIG. 2 is a perspective view showing the appearance of the imaging device of Embodiment 1.

Embodiments of the present invention will be described in detail below with reference to the drawings. Incidentally, configurations shown in the following embodiments are mere examples, and the present invention is not limited to the shown configurations. In the drawings, the same reference numerals are used for the same elements, and overlapping descriptions are omitted.

Before specific descriptions of the embodiments, a brief explanation of noise reduction in the present embodiments will be given below.

In the present embodiments, a pixel value after noise reduction is calculated for each pixel included in a specific region in an input image. A partial region (referred to as "a target region" in the present specification) including a pixel to be processed (referred to as "a target pixel" in the present specification; the number of target pixels may be one or may be two or more) in an input image is set, and a set of signal values of pixels included in the target region is extracted as target data. Next, for a plurality of reference pixels corresponding to the target pixel, a set of signal values of pixels in a region including a reference pixel(s) (referred to as "a reference region" in the present specification) is obtained as reference data. However, the number of pixels (the number of signal values) in each of at least one of a plurality of pieces of obtained reference data is larger than the number of pixels included in the target region (in other words, the reference region is larger than the target region). A correlation value between each of the pieces of obtained reference data and the target data is calculated to determine a weight corresponding to each reference pixel according to the correlation value. On this occasion, the weight is determined so that as the correlation value becomes higher, that is, the reference data becomes more similar to the target data, the weight becomes larger. Next, transformation reference data is generated by performing transformation so that the number of pixels in each piece of reference data (that is, the number of pixels included in each reference region) becomes equal to the number of pixels in the target data (that is, the number of pixels included in the target region). On this occasion, in a case where the number of pixels in the reference data is larger than the number of pixels in the target data, the reference data is reduced by averaging the pixels included in the reference data. As a result, the number of pixels in the reference data, which is larger than that of the target data, becomes smaller and transformation is performed to reduce the reference data, and because of averaging, noise reduction processing is performed on the transformation reference data. Of pixels included in the transformation reference data, pixels generated by reducing the reference pixels will be referred to as transformation reference pixels in the present specification. The weighted average of the signal values of the transformation reference pixels in a plurality of pieces of transformation reference data is calculated by using the weights determined according to the correlation values. Therefore, a signal value obtained by using the weighted average is obtained by combining the pixels to perform averaging processing and performing the above reduction transformation, and accordingly, the effect of performing two noise reduction operations is achieved. Accordingly, the large effect of noise reduction can be achieved by replacing the signal value of the target pixel with the signal value obtained by using the weighted average. The above processing makes it possible to achieve the large effect of noise reduction without increasing the number of reference pixels used for the weighted average for noise reduction for the target pixel, that is, without increasing the amount of calculation of the correlation value for determining the weights.

Embodiment 1

An explanation will be made on an imaging system to which an image processing method of Embodiment 1 is applied. FIG. 1A is a block diagram showing the basic configuration of the imaging system of Embodiment 1. FIG. 2 is a perspective view showing the appearance of the imaging system (more specifically, an imaging device 100) of Embodiment 1.

An image obtaining unit 101 includes an imaging optical system and an imaging element. A charge coupled device (CCD), a complementary metal-oxide semiconductor (CMOS), or the like may be used as the imaging element. At the time of photographing, light incident on the image obtaining unit 101 is collected by the imaging optical system and converted into an analog electric signal via the imaging element. The analog electric signal is converted into a digital signal via an A/D converter 102. An image represented by the digital signal is input to an image processing unit 103. In addition to given processing, the image processing unit 103 performs noise reduction processing according to the present embodiment. FIG. 1B is a block diagram showing the detailed configuration of the image processing unit 103. The image processing unit 103 includes an input image obtaining unit 103-1, a target data extracting unit 103-2, a reference data obtaining unit 103-3, and a correlation value calculating unit 103-4. Further, the image processing unit 103 includes a transformation reference data generating unit 103-5, a reference data determining unit 103-6, a weight determining unit 103-7, a target pixel replacing unit 103-8, and a noise reduction processing completion determining unit 103-9. A series of operations by these elements (that is, noise reduction processing) will be described in detail later with reference to a flow chart of FIG. 3. Incidentally, an image already stored in an image storage medium 104 may be read to perform noise reduction processing by the image processing unit 103 in a similar manner.

In a case where one views an image stored in the image storage medium 104, the image is output to a display unit 105 including a liquid crystal display.

The above series of controls is performed by a system controller 106, and the image obtaining unit 101 is mechanically driven by a controlling unit 107 according to an instruction from the system controller 106.

Figure 3:
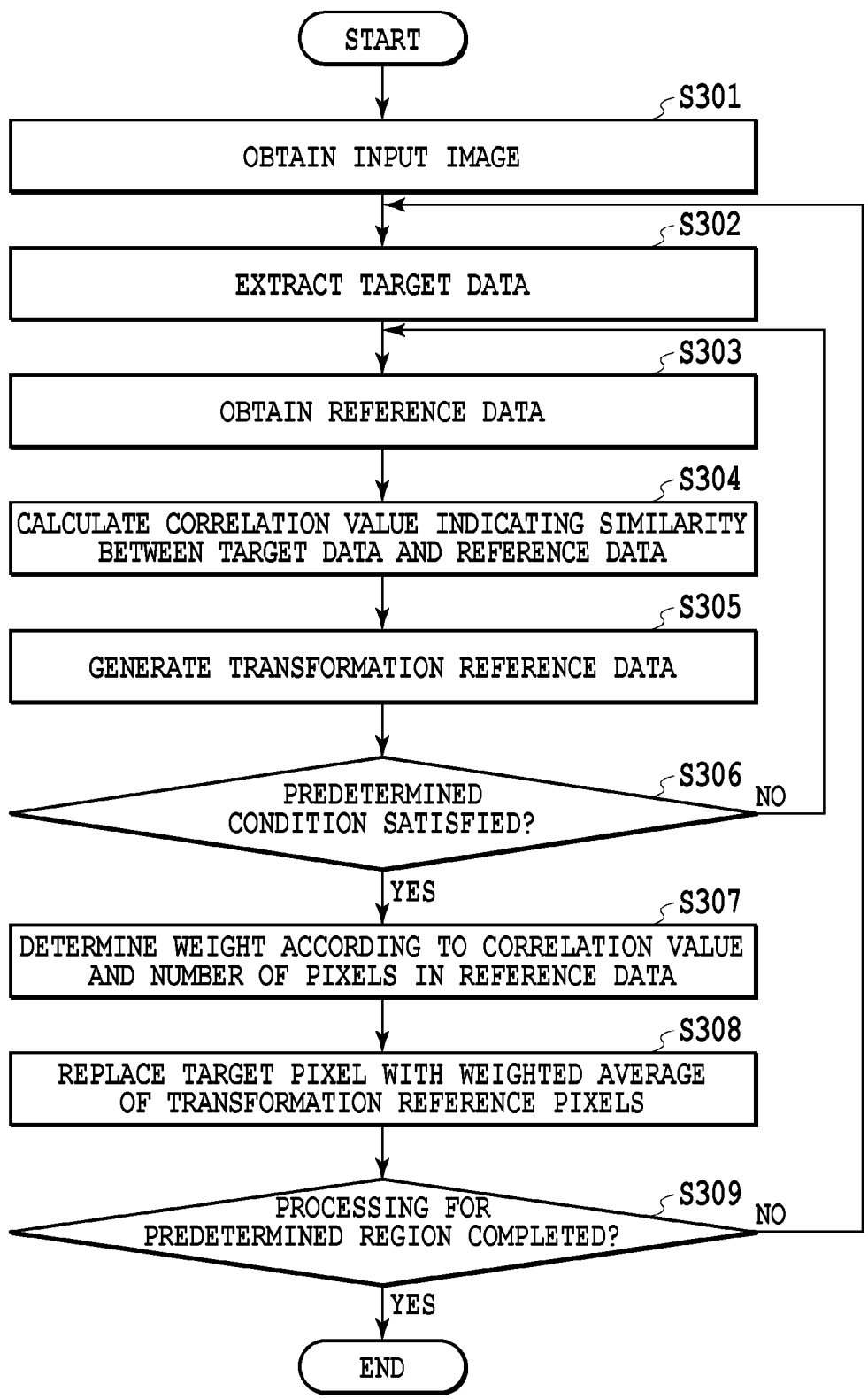
FIG. 3 is a flow chart for noise reduction processing in Embodiments 1 to 3.

The noise reduction processing performed by the image processing unit 103 will be described in detail with reference to FIGS. 3 to 6. FIG. 3 is the flow chart of the noise reduction processing of the present embodiment.

In step S301, the input image obtaining unit 103-1 obtains an input image obtained by the image obtaining unit 101. The input image includes shot noise generated by the imaging element.

In step S302, the target data extracting unit 103-2 specifies a target pixel in the input image, and extracts, as target data corresponding to the target pixel, a set of signal values of pixels included in a partial region (that is, "a target region") including the target pixel. The target pixel is a pixel on which noise reduction is to be performed, and a single target pixel (that is, one target pixel) or a plurality of target pixels may be specified at a time. The present embodiment will be explained by taking, as an example, a case where the number of target pixels is one. The following processing also applies to a case where a plurality of target pixels are specified at a time.

Figure 4:
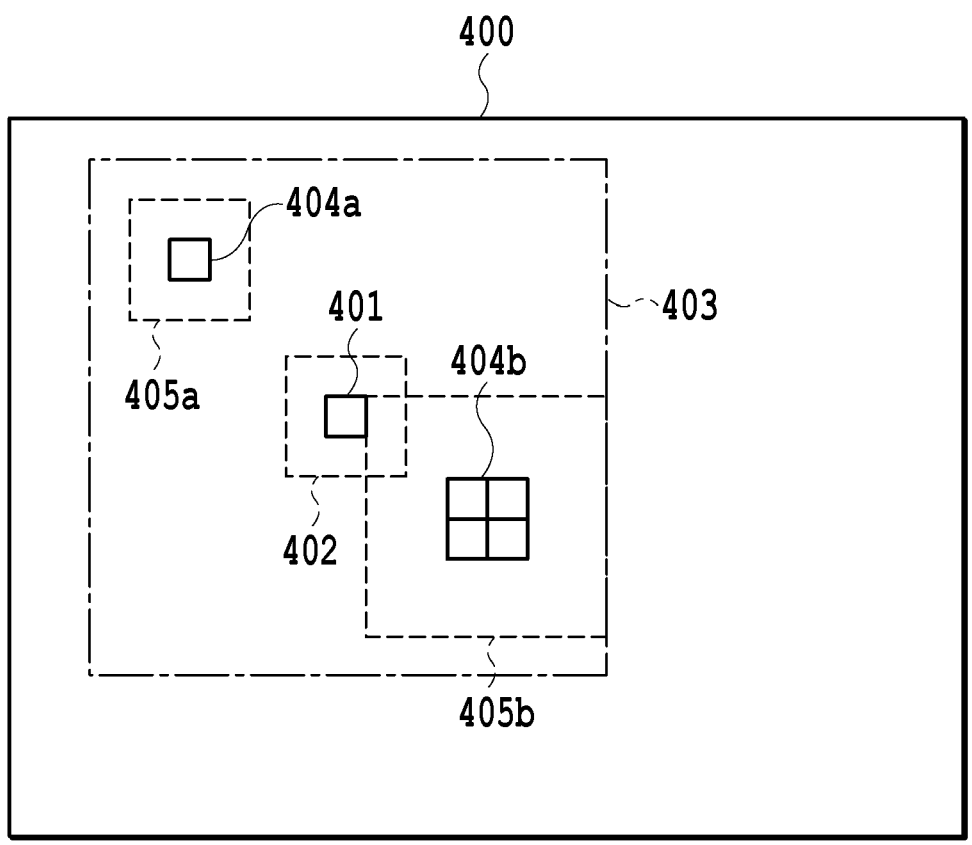
FIG. 4 is an explanatory view for explaining obtainment of target data and obtainment of reference data in Embodiments 1 to 3.

The target data is information on the distribution of the signal values corresponding to the target pixel. Accordingly, the target region for obtaining the target data must include a plurality of pixels. In the present embodiment, the number of target pixels is one, and the target region must include pixels the number of which is equal to or larger than the number of target pixels and must include the target pixel. As shown in FIG. 4, for example, a target pixel 401 in an input image 400 is set, and a target region 402 including the target pixel is set. In an example shown in FIG. 4, the number of target pixels 401 is one; a region including the target pixel and eight pixels around the target pixel is set as the target region 402; and a set of signal values of pixels included in the target region 402 is set as the target data. However, the target pixel and the target region are not limited to those of this example in respect of their sizes, shapes, and extraction positions.

Figure 12:
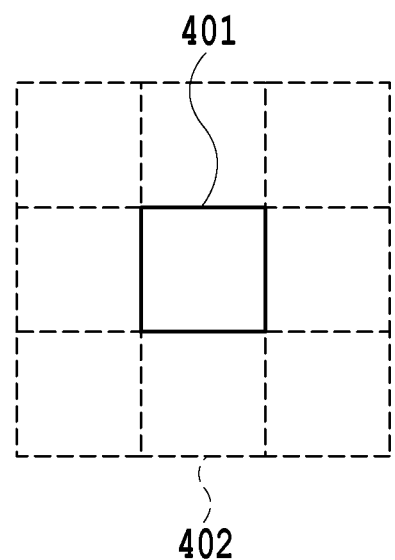
FIG. 12 is a view showing an example of a target pixel and a target region in Embodiments 1 to 3.
Figure 13A:
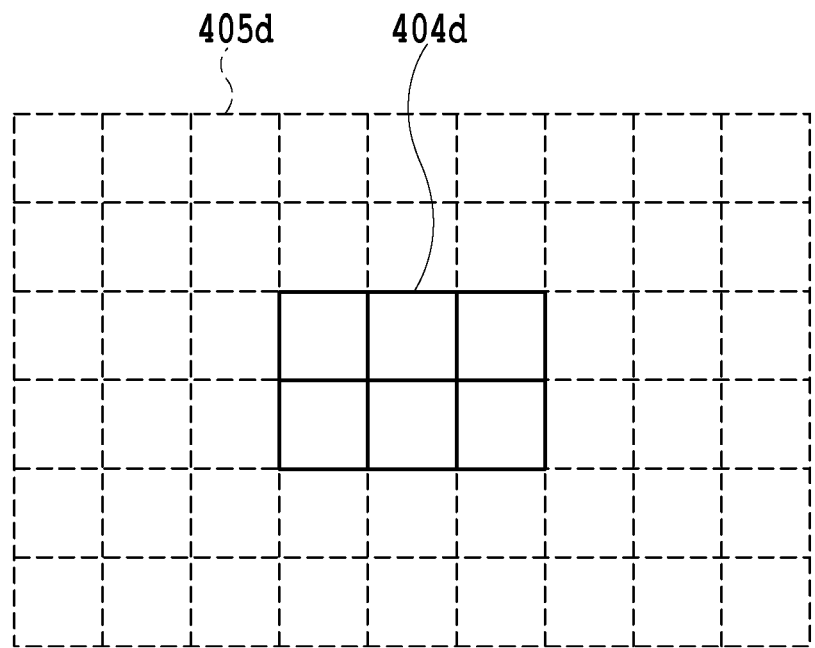
FIGS. 13A and 13B are views showing examples of reference pixels and a reference region in Embodiments 1 to 3.
Figure 13B:
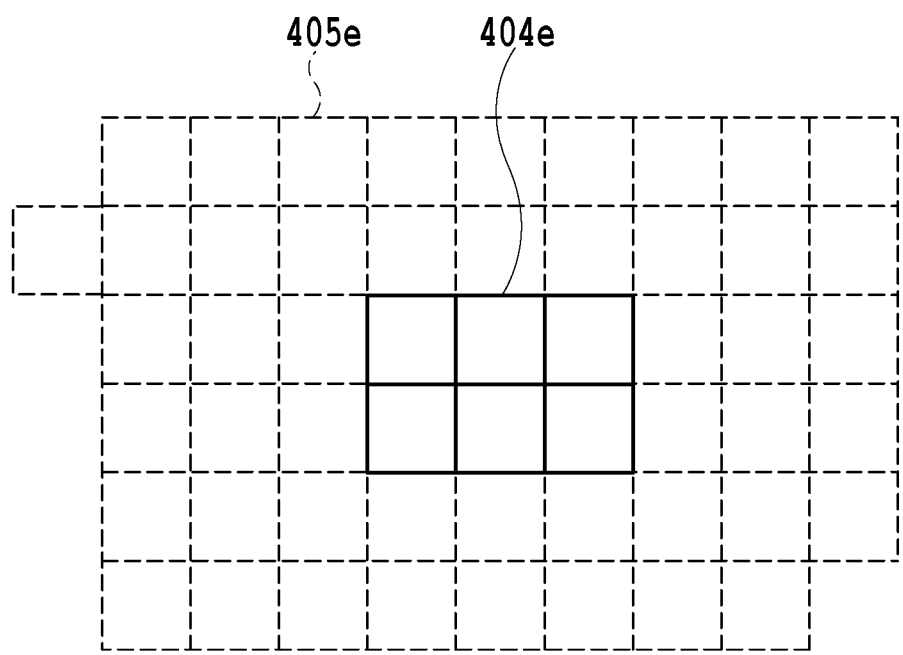

In step S303, the reference data obtaining unit 103-3 obtains a plurality of pieces of reference data corresponding to the target data. Each piece of the reference data is a set of signal values of pixels included in a reference region including one or more reference pixels. The reference pixel is a pixel used for a weighted average for calculating the signal value of the target pixel after noise reduction. Like the target data, the reference data also needs to have information on the distribution of the signal values corresponding to the reference pixels. An explanation will be made on how to obtain the reference data with reference to FIGS. 12, 13A, and 13B. Now assume that in step S302, the set of signal values in the target region 402 including the target pixel 401 is obtained as the target data as shown in FIG. 12. On this occasion, the reference region and the target region 402 have a similarity relationship just as the target pixel 401 and the reference pixels have a similarity relationship with respect to two directions of the image (in the present embodiment, the two directions are a longitudinal direction and a lateral direction because the image has a lattice pattern). This will be described with reference to FIGS. 13A and 13B. In FIG. 13A, the number of reference pixels 404d in a column is two times the number of target pixels 401 in a column, and the number of reference pixels 404d in a row is three times the number of target pixels 401 in a row. Accordingly, the longitudinal length of the reference region 405d is two times the longitudinal length of the target region 402, and the lateral length of the reference region 405d is three times the lateral length of the target region 402. In a case where like the number of reference pixels 404a in FIG. 4, the number of reference pixels is equal to the number of target pixels 401, the size of a reference region 405a is equal to the size of the target region 402. However, a reference region 405e may be taken as shown in FIG. 13B. The reference pixels 404e have the same shape as the reference pixels 404d, but the reference region 405e is not completely identical to the reference region 405d. However, an extra pixel protruding at a left side of FIG. 13B may be ignored later at the time of calculating a correlation value, or may be absorbed by size reduction processing performed at the time of generating transformation reference data obtained by reducing the reference data so that the reference data has the same number of components as the target data. A pixel missing in a lower right portion of FIG. 13B may be interpolated with a pixel around the missing pixel. However, in a case where the interpolating processing is performed, the precision of calculating a correlation value later becomes lower, and accordingly, it is desirable that a similarity relationship between the reference region and the target region be identical to a similarity relationship between the reference pixels and the target pixels.

Incidentally, the reference data may be obtained from pixels on the same input image as the target data or may be obtained from a different image. Further, in a case where the target data is extracted from a certain color component (for example, green) of the input image, the reference data may be obtained from another color component (red or blue) of the input image. However, from the viewpoint of using the self-similarity of subject space, in a case where the reference data is obtained from a different image, it is desirable that the different image include a subject identical or similar to that of the image from which the target data is obtained. Further, in a case where the reference data is obtained from the image from which the target data is obtained, it is highly probable that a shape similar to the one drawn based on the target data exists near a group of pixels from which the target data is obtained. Accordingly, in order to increase the speed of the processing, a region which is searched to obtain the reference data may be set to be only a region near the target region. For example, as shown in FIG. 4, an extraction region 403 is set. However, the size and shape of the extraction region are not limited to those of this example. The reference data is extracted from the extraction region like the reference region 405a including the reference pixel 404a as shown in FIG. 4, for example. However, the reference region and the reference pixel are not limited to those of this example in respect of their sizes, shapes, and extraction positions.

Since a plurality of pieces of reference data are required for a piece of target data, step S303 is repeated a plurality of times. On this occasion, the number of pixels in each of at least one of pieces of obtained reference data is larger than the number of pixels in the target data. For example, a reference region 405b including many pixels is extracted as shown in FIG. 4. The number of pixels included in the reference region 405b is 36, and equals four times the number of pixels included in the target region 402 which is nine. Accordingly, the number of reference pixels 404b is also four. The effect of noise reduction can be enhanced by weight-averaging transformation reference pixels obtained by reducing the reference region including so many pixels after that.

In step S304, the correlation value calculating unit 103-4 obtains a correlation value indicating similarity between the target data and the reference data. A feature-based method such as SIFT (Scale-Invariant Feature Transform) or SURF (Speeded-UP Robust Features) or a region-based method which will be described later may be used to calculate the correlation value. The feature-based method pays attention to similarity between the amount of features in the target data and the amount of features in the reference data, and accordingly can calculate the correlation value even in a case where the number of pixels in the target data is different from the number of pixels in the reference data. On the other hand, the region-based method pays attention to a difference between the signal value of each pixel included in the target data and the signal value of each pixel included in the reference data. Accordingly, in a case where the number of pixels in the target data is not equal to the number of pixels in the reference data, the correlation value cannot be calculated correctly. However, similarity can be determined with higher precision by using the region-based method to calculate the correlation value than by using the feature-based method, and accordingly, it is desirable to use the region-based method.

Two examples of a region-based correlation value calculating formula will be cited below. However, the present embodiment is not limited to the following two examples. Further, for the sake of simplicity, the following explanation will be made on formulas, assuming a case where a signal is a single signal without considering color components (RGB) of an input image, but the present embodiment can also be applied to a case where a signal has a plurality of color components.

<Example 1 of Correlation Value Calculating Formula>

An explanation will be made on a case where a correlation value is calculated by using the root mean square of a difference between a signal value which the target data has and a signal value which the reference data has. In a case where the target data and the reference data are handled by using matrixes, a correlation value calculating formula $g_1$ is realized by the following formula (1).

[Formula 1]

$$g_1(T, R_k) = \frac{1}{NM}\left[\sum_{i,j}(T_{ij} - P_{ij})^2\right]^{\frac{1}{2}} \quad (1)$$

T is a matrix having, as a component $T_{ij}$, the signal value of each pixel in the target data; N is the number of rows in T; M is the number of columns in T; and $R_k$ is a matrix having, as a component, each signal value in kth reference data. P is data obtained as a result of making the number of pixels in the reference data equal to the number of pixels in the target data. The matrix P satisfies the following formula (2), and $P_{ij}$ represents a component of the matrix P.

[Formula 2]

$$P = \sigma\left(R_k, \frac{N}{N_{Rk}}, \frac{M}{M_{Rk}}\right) \quad (2)$$

$N_{Rk}$ is the number of rows in the kth reference data $R_k$, and $M_{Rk}$ is the number of columns in the kth reference data $R_k$. Further, the right side $\sigma(R_k, N/N_{Rk}, M/M_{Rk})$ of the formula (2) represents transformation such that the number of rows after transformation is $N/N_{Rk}$ times the number of rows in the kth reference data $R_k$ and the number of columns after transformation is $M/M_{Rk}$ times the number of columns in the kth reference data $R_k$ (in the case of an image, enlarging or reducing the image). Bi-linear interpolation, bi-cubic interpolation, or the like may be used for the transformation σ.

Further, in a case where the target data and the reference data are handled as vectors having each signal value as a component, the formula (1) is rewritten into the following formula (3).

[Formula 3]

$$g_2(t, r_k) = \frac{1}{NM}\left[\sum_i (t_i - \rho_i)^2\right]^{\frac{1}{2}} \quad (3)$$

A vector t is a vector having, as a component $t_i$, the signal value of each pixel in the target data; a vector $r_k$ is a vector having, as a component, the signal value of each pixel in the kth reference data; ρ is a vector in which the components of the matrix P are rearranged in one dimension; and $\rho_i$ is a component of ρ.

In the correlation value calculating formulas represented by the formulas (1) and (3), the correlation value is calculated based on the difference between the signal value of each pixel in the target data and the signal value of each pixel in the reference data, and accordingly, as the calculated correlation value becomes closer to zero, similarity between the target data and the reference data becomes higher.

The correlation value is calculated to determine how much the structure of the target data is similar to that of the reference data. Accordingly, the lightness (direct current component) of the target data is irrelevant to that of the reference data. Therefore, the direct current component (which refers to the average of the signal values and corresponds to the lightness of the image) may be subtracted from the signals in the target data and the reference data. The contrast of the reference data may be adjusted so that the correlation between the target data and the reference data becomes highest (that is, in the present embodiment using the formula (1), the calculated correlation value becomes closest to zero). This contrast adjustment corresponds to scalar multiplication of the alternating current component of the reference data. In this case, the formula (1) is rewritten into the following formula (4).

[Formula 4]

$$g_3(T, R_k) = \frac{1}{NM}\left[\sum_{i,j} \{(T_{ij} - T_{ave}) - c(P_{ij} - P_{ave})\}^2\right]^{\frac{1}{2}} \quad (4)$$

$T_{ave}$ and $P_{ave}$ are the average of signal values of the matrix T indicating the target data and the average of signal values of the matrix P indicating the reference data, respectively. The averages may be calculated by using a uniform weight or may be calculated by using a weighted average. c is a coefficient for adjusting contrast and is represented by the following formula (5) using the least squares method.

[Formula 5]

$$c = \frac{\sum_{i,j}(T_{ij} - T_{ave})(P_{ij} - P_{ave})}{\sum_{i,j}|P_{ij} - P_{ave}|^2} \quad (5)$$

In a case where the correlation value is calculated by using the formula (4), it is necessary to adjust lightness and contrast for transformation reference data generated in step S305 in a later stage as well. This will be described later.

<Example 2 of Correlation Value Calculating Formula>

The correlation value may be calculated by using SSIM (Structure Similarity). A correlation value calculating formula using SSIM is represented by the following formula (6).

[Formula 6]

$$g_{SSIM}(t, r_k) = [L(t,\rho)]^\alpha [C(t,\rho)]^\beta [S(t,\rho)]^\gamma \quad (6)$$

L, C, and S are evaluation functions for lightness, contrast, and another structure, respectively, and have a value in the range of 0 to 1. As the value of an evaluation function becomes closer to 1, the target data and the reference data which are compared become closer to each other in respect of the evaluation item. α, β, and γ are parameters for adjusting weights for the evaluation items, respectively. In a case where α=0, the correlation value is calculated by subtracting the direct current component (lightness). In a case where β=0, the correlation value is calculated by ignoring the dispersion of the alternating current component. Accordingly, in a case where α=0 and β=0, the correlation value can be calculated based on only the structure of the target data t and the structure of the reference data $r_k$. Further, the correlation value may be calculated by using a plurality of correlation value calculating formulas in combination.

Further, in a case where the formula (1), (3) or (6) described above in <Example 1 of Correlation Value Calculating Formula> or <Example 2 of Correlation Value Calculating Formula>, for example, is used to perform the region-based calculation of the correlation value, isometric transformation may be performed on the reference data so that correlation with the target data becomes highest. The isometric transformation is, for example, identical transformation, rotation transformation, or inversion transformation. On this occasion, transformation achieving the highest correlation is performed on the transformation reference data generated in step S305 as well. The effect of noise reduction can be improved by finding reference data having higher similarity. Incidentally, in a case where the isometric transformation is performed, the amount of calculation becomes larger, and accordingly, the desired effect of noise reduction and the amount of calculation may be compared with each other to determine whether to perform the isometric transformation.

Figure 5:
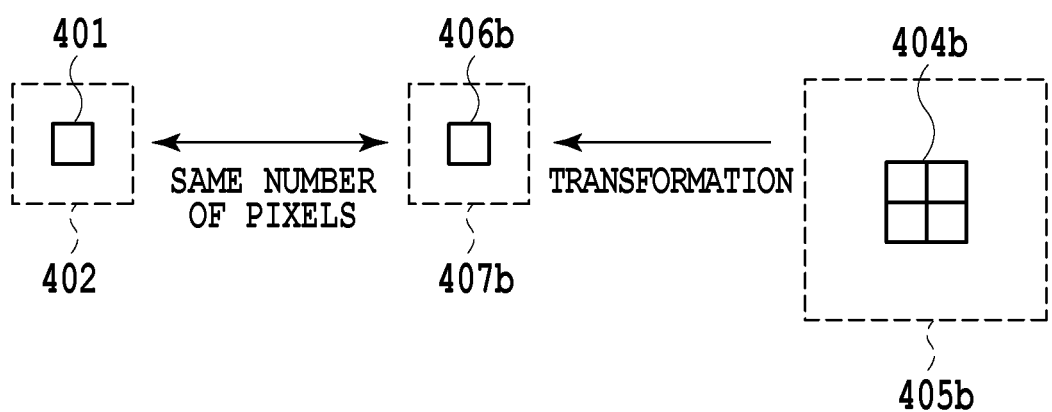
FIG. 5 is an explanatory view for explaining calculation of a correlation value in Embodiments 1 to 3.

In step 305, the transformation reference data generating unit 103-5 generates the transformation reference data. The transformation reference data is obtained by transforming the reference data so that the number of pixels in the reference data becomes equal to the number of pixels in the target data. For example, the transformation σ used in the formula (2) is used to generate the transformation reference data. In a case where the region-based calculation of the correlation value is performed in step S304, the transformation reference data is already generated in step S304 and may be used for the calculation. More specifically, as shown in FIG. 5, for example, the transformation reference data is generated by transforming the reference data which is a set of the signal values of the pixels included in the reference region 405b including the reference pixels 404b. The transformation reference data is composed of the signal values of pixels included in a transformation reference region 407b including a transformation reference pixel 406b corresponding to the reference pixels 404b. Incidentally, in the present embodiment, in a case where the number of pixels included in the reference region is equal to the number of pixels included in the target region, the signal values of the pixels in the reference data are used as they are as the signal values of the pixels in the transformation reference data.

Incidentally, in a case where the direct current component is subtracted and the contrast is adjusted in the calculation of the correlation value in step S304, lightness and contrast must be adjusted for the transformation reference data as well. In a case where this adjustment is represented by using a matrix, transformation reference data $D_k$ obtained by transforming the reference data $R_k$ is represented by the following formula (7).

[Formula 7]

$$D_k = c(P - P_{ave}E) + T_{ave}E \quad (7)$$

E is an N×M matrix in which all components are 1.

In step S306, the reference data determining unit 103-6 determines whether the number of pieces of obtained reference data satisfies a predetermined condition. More specifically, in a case where it is determined that all the reference data in the extraction region is obtained or that the number of pieces of obtained reference data is large enough, the process proceeds to step S307. For example, in a case where the number of pieces of obtained highly relevant reference data is equal to or larger than a threshold determined based on the level of noise reduction, it may be determined that the number of pieces of obtained reference data is large enough. In a case where the number of pieces of obtained reference data does not satisfy the predetermined condition, the process returns to step S303, and new reference data is obtained. Further, in the above processing, a piece of reference data is obtained at a time, and similar processing is repeated, but a plurality of pieces of reference data may be obtained at a time, and processes for the respective pieces of reference data in steps S304 and S305 may be performed in parallel.

In step S307, the weight determining unit 103-7 determines a weight corresponding to each transformation reference pixel based on the correlation value obtained in step S304. In the present embodiment, the correlation value between the reference data before transformation and the target data is calculated, but this correlation value continuously shows similarity between the target data and the reference data after transformation. In other words, as the correlation value of the reference data from which the transformation reference data is calculated becomes higher, similarity between the transformation reference data and the target data becomes higher. Accordingly, as the correlation value obtained in step S304 indicates higher correlation between the target data and the reference data, the weight corresponding to each transformation reference pixel is set at a higher value. This makes it possible to perform noise reduction for the target pixel while maintaining the structure of the target data. For example, the weight is determined according to the following formula (8).

[Formula 8]

$$w_k = \frac{1}{Z}\exp\left[-\frac{g_1(T, R_k)}{h^2}\right] \quad (8)$$

$w_k$ represents a weight corresponding to a kth transformation reference pixel, and h represents the intensity of a filter. Z is a normalization factor for the weight $w_k$ and satisfies the following formula (9).

[Formula 9]

$$Z = \sum_k \exp\left[-\frac{g_1(T, R_k)}{h^2}\right] \quad (9)$$

In this regard, it is desirable to vary the weight according to the number of pixels in the reference data before transformation. In a case where the number of pixels in the reference data is larger than the number of pixels in the target data, size reduction transformation is performed to generate the transformation reference pixel. In other words, noise reduction is performed to generate the transformation reference pixel. Accordingly, even in a case where two pieces of transformation reference data have the same correlation value, the higher effect of noise reduction can be achieved in subsequent step S308 by making a weight for one transformation reference pixel generated by performing size reduction transformation larger than a weight for the other transformation reference pixel. In a case where the reference pixels are reduced to a greater degree to generate the transformation reference pixel, the effect of noise reduction becomes higher, and accordingly, it is preferable to set the weight to be larger as the number of pixels in the reference data exceeds the number of pixels in the target data by a larger margin. Therefore, in a case where a correlation value between first reference data and the target data is equal to a correlation value between second reference data and the target data and the number of pixels in the second reference data is larger than the number of pixels in the first reference data, it is desirable to make a weight corresponding to the second reference data larger than a weight corresponding to the first reference data. On the other hand, in a case where the number of pixels in the reference data is smaller than the number of pixels in the target data, enlargement processing is performed to generate the transformation reference pixel, and accordingly, noise increases. Therefore, in this case, it is desirable to reduce a weight for the transformation reference pixel.

Incidentally, processing in step S307 may be performed at any time between step S304 and step S308.

In step S308, the target pixel replacing unit 103-8 calculates the weighted average of the transformation reference pixels by using the weights determined in previous step S307 and replaces the signal value of the target pixel with the calculated value. Then, noise reduction for the target pixel is completed. The weighted average signal value $s_{ave}$ is calculated according to the following formula (10), for example.

[Formula 10]

$$S_{ave} = \sum_k w_k s_k \quad (10)$$

$s_k$ is the signal value of a transformation reference pixel in the kth transformation reference data. However, a weighted average calculating method is not limited to this. For example, non-linear combination may be used.

A plurality of pixels are combined to average the signal values and reduce noise. The signal value of the target pixel is replaced with this weighted average signal value $s_{ave}$ to generate an output pixel obtained by performing noise reduction on the target pixel. Further, on this occasion, another noise reduction method may be used at the same time. Otherwise, learning-type noise reduction performed by referring to the weighted average signal value may be used instead of the above replacing processing.

Figure 6:
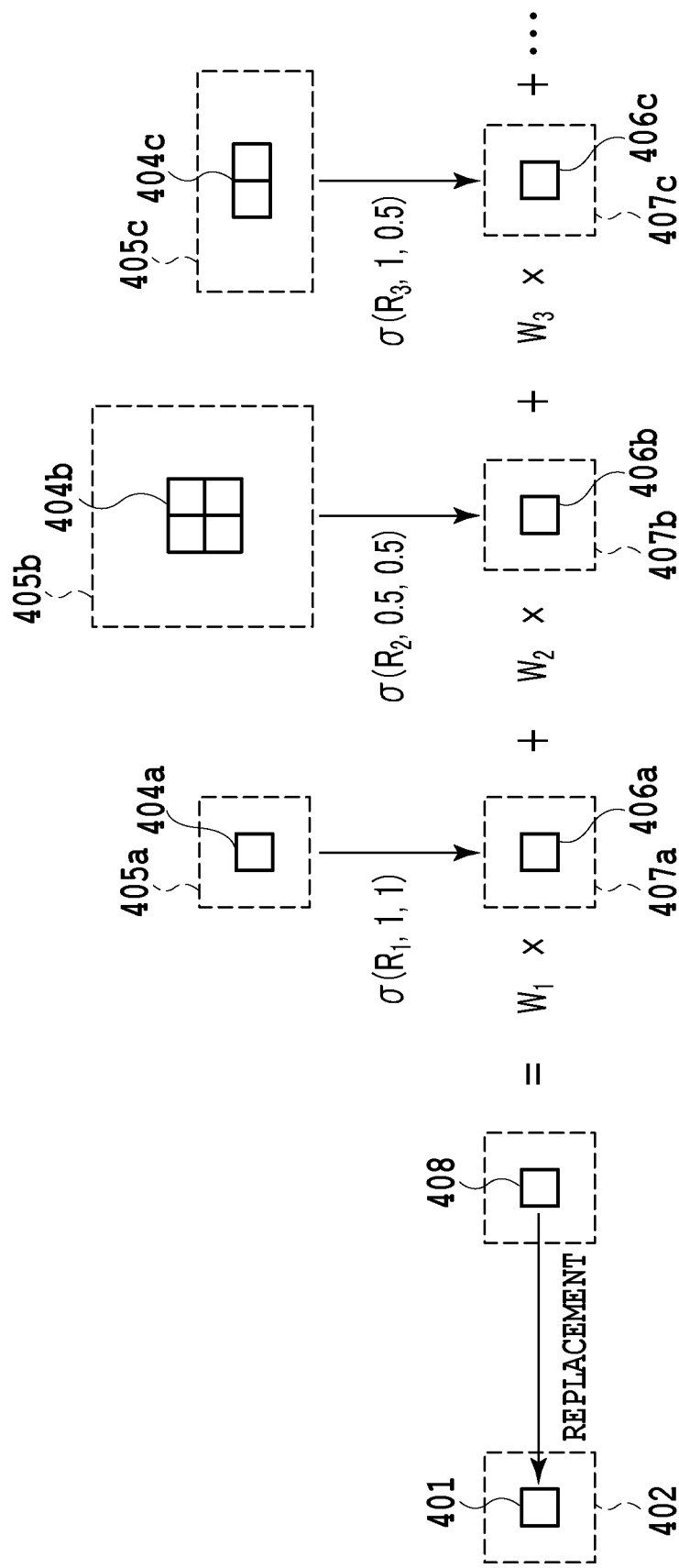
FIG. 6 is an explanatory view for explaining noise reduction in Embodiments 1 to 3.

A flow from step S303 to step S308 will be described with reference to FIG. 6. Reference data is obtained which is composed of the signal values of pixels included in each of reference regions 405a, 405b, and 405c having different numbers of pixels (in addition to the reference regions 405a, 405b, and 405c, other reference regions exist, but an explanation thereof is omitted). Next, transformation is performed to generate transformation reference data which is composed of the signal values of pixels included in transformation reference regions 407a to 407c having the same number of pixels as the target data 402. Next, a weighted average for transformation reference pixels 406a to 406c included in the transformation reference regions 407a to 407c is calculated. The signal value of the target pixel 401 is replaced with the calculated weighted average signal value (which a pixel 408 has), and noise reduction for the target pixel 401 is completed.

In step S309, the noise reduction processing completion determining unit 103-9 determines whether processing for a predetermined region of the input image is completed. As a result of the determination, in a case where processing is completely performed on all target pixels on which noise reduction is to be performed, the processing is ended, and in a case where a target pixel to be processed remains, the process returns to step S302 and target data including the target pixel to be processed is newly extracted.

The above configuration can provide an imaging system having the large effect of noise reduction while suppressing an increase in calculation load.

Incidentally, in the present embodiment, an explanation has been made on the example in which the target region includes one target pixel. However, the target region may include a plurality of target pixels. In this case, noise reduction is simultaneously performed on the plurality of target pixels. The signal value of each target pixel on which noise reduction is performed can be calculated by calculating the formula (10) for each target pixel included in the target region, for example. Further, in a case where the number of target pixels is two or more, a region including the plurality of target pixels itself may be used as a target region for obtaining target data. This is because the target pixels already have a plurality of signal value components necessary for the target data, that is, information on a signal value distribution.

Further, a description will be given of a desirable condition for enhancing the effects of the present embodiment.

It is desirable that the target data extracted in step S302 have pixels larger in number than the target pixels. Transformation reference pixels having a structure more similar to that of the target pixels can be found by using information on pixels around the target pixels included in the target data in order to calculate a correlation value.

In step S303, it is desirable that not less than half of the plurality of pieces of obtained reference data have pixels larger in number than the pixels in the target data. This is because as the number of pieces of the reference data on which size reduction processing is performed to generate transformation reference data becomes larger, the effect of noise reduction becomes larger. Accordingly, it is desirable that all the reference data for the target data have pixels larger in number than the target data.

Further, it is desirable that before step S303, the step of determining the level of noise reduction for the input image be performed, and the range of the number of pixels which the reference data can have be determined according to the determined level. The number of pixels may be consecutive between 9 and 25, for example, or may be inconsecutive like being any of 9, 16, and 36. Further, the maximum value and minimum value of the number of pixels may be the same like being only 36. The level of noise reduction may be uniform across the entire input image or may vary depending on the target data. A user may select a method for determining the level of noise reduction or may estimate a noise level from an image by using a method such as the median absolute deviation (MAD), so that the method for determining the level of noise reduction is automatically selected based on the result of the estimate. As the number of pixels in the reference data becomes larger, the effect of noise reduction becomes larger, and accordingly, the range of the number of pixels is set so that as the level of noise reduction becomes larger, the number of pixels in the reference data becomes larger.

Further, it is desirable to obtain the reference data in step S303 so that a ratio between the number of pixels within the longitudinal length of the reference region and the number of pixels within the lateral length of the reference region is equal to a ratio between the number of pixels within the longitudinal length of the target region and the number of pixels within the lateral length of the target region. More specifically, in the case of considering the target data and the reference data by using matrixes as in the formula (1), it is established that $N/N_{Rk}=M/M_{Rk}$. In a case where $N/N_{Rk} \neq M/M_{Rk}$ as in the reference region 405c in FIG. 6 (in this case, $N/N_{Rk}=1$ and $M/M_{Rk}=0.5$), the effect of noise reduction varies depending on a direction.

Regarding adjustment of contrast represented by the formulas (4) and (5) in calculation of the correlation value in step S304, in a case where c>1, a signal in the reference data is amplified, and this means that noise is also increased. Accordingly, it is desirable that c≤1, or in a case where c>1, it is desirable to make smaller the weights determined in step S307.

Further, an explanation has been made above by taking, as an example, the configuration in which the reference data is output as the transformation reference data as it is in a case where the number of signal values included in the reference data (that is, the number of pixels included in the reference region) is equal to the number of signal values included in the target data (that is, the number of pixels included in the target region). However, the present embodiment is not limited to this example. For example, determination may be made based on the number of pixels in the reference data before step S305 for generating the transformation reference data to perform branching processing. On this occasion, in a case where the number of pixels in the reference data is different from the number of pixels in the target data, the process proceeds to step S305. In a case where the number of pixels in the reference data is equal to the number of pixels in the target data, the signal values of the reference pixels may be output as they are and used in step S308 without proceeding to step S305.

Embodiment 2

Figure 7:
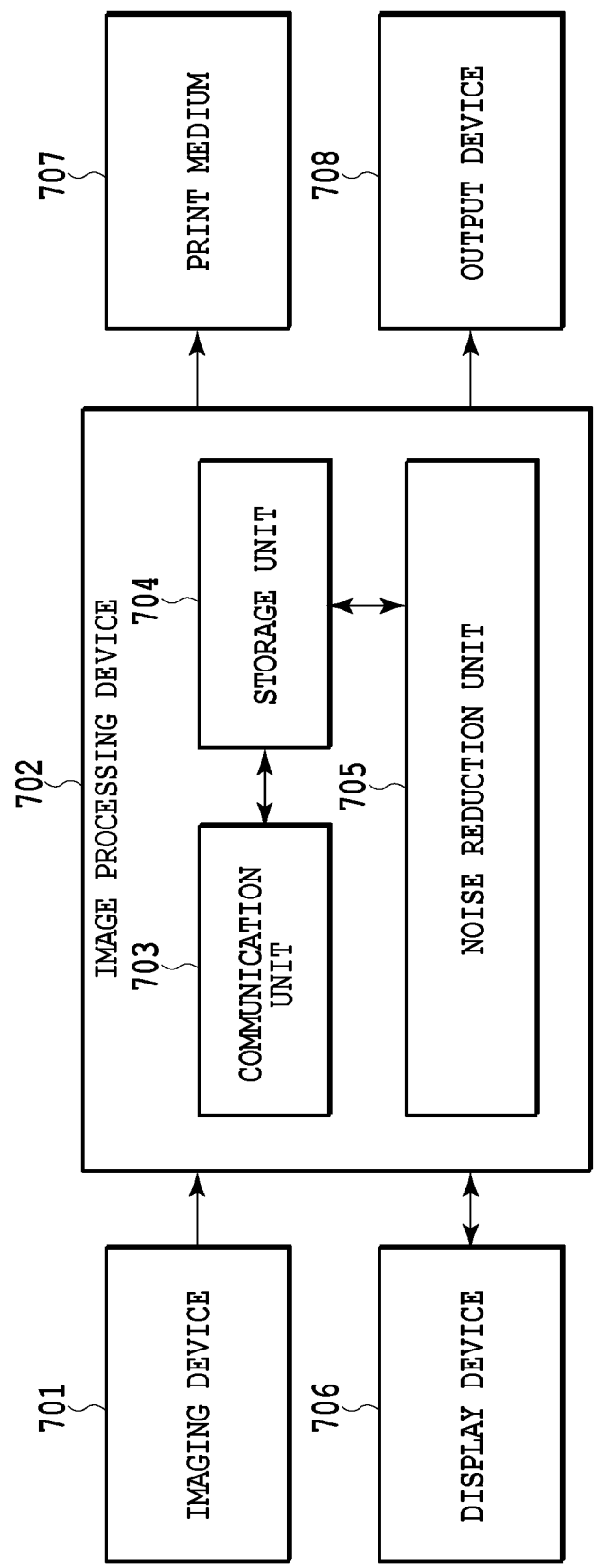
FIG. 7 is a block diagram of an image processing system of Embodiment 2.
Figure 8:
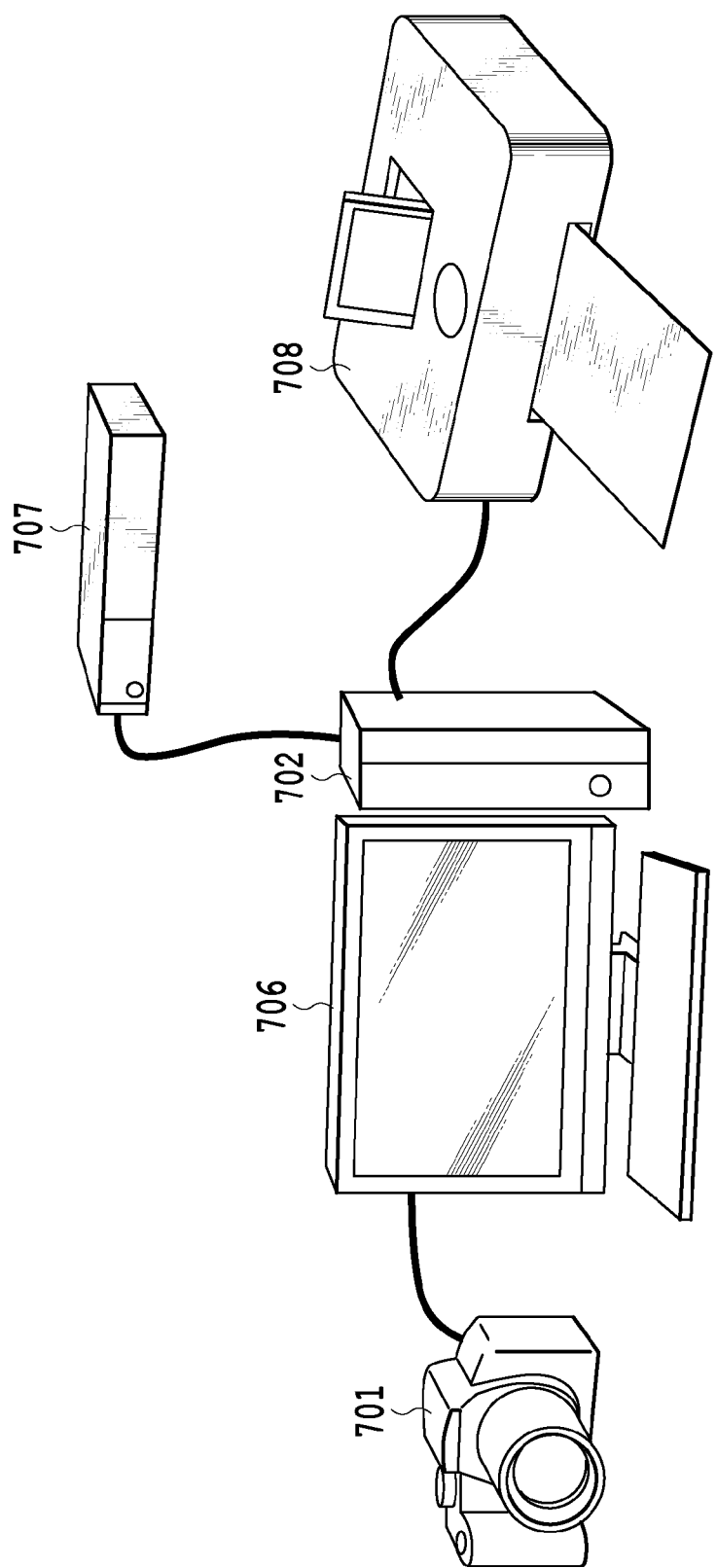
FIG. 8 is an appearance diagram of the image processing system of Embodiment 2.

An explanation will be made on an image processing system to which an image processing method of Embodiment 2 is applied. The feature of the present embodiment is that an imaging device and a device for performing noise reduction exist separately and are connected via a cable or the like. FIG. 7 is a block diagram of an image processing system of Embodiment 2. Further, FIG. 8 shows the appearance of the configuration of the image processing system of Embodiment 2.

An input image obtained in an imaging device 701 is input to an image processing device 702 via a communication unit 703. The input image and if necessary, its photographing condition information (a focal distance, an aperture value, ISO sensitivity, and the like at the time of photographing) are stored in a storage unit 704. A noise reduction unit 705 includes the same elements as those of the image processing unit 103 (see FIG. 1B) and performs noise reduction processing on the input image. An output image after noise reduction processing is output to one or more of a display device 706, a print medium 707, and an output device 708 via the communication unit 703. The display device 706 is, for example, a liquid crystal display or a projector. A user can perform operations while confirming an image which is being processed via the display device 706. The print medium 707 is, for example, a semiconductor memory, a hard disk, or a server on a network. The output device 708 is a printer or the like. The image processing device 702 may have the function of performing developing processing or other image processing, if necessary.

A processing flow for the noise reduction unit 705 of the present embodiment is as shown in FIG. 3. Accordingly, an explanation of a feature similar to that of Embodiment 1 is omitted in the following explanation, and a feature different from that of Embodiment 1 will be described.

In step S301, the input image obtaining unit 103-1 obtains the input image photographed by the imaging device 701. On this occasion, photographing condition information may be obtained at the same time to determine the level of noise reduction from ISO sensitivity included in the information.

The above configuration can provide an image processing system having the large effect of noise reduction while suppressing an increase in calculation load.

Embodiment 3

Figure 9:
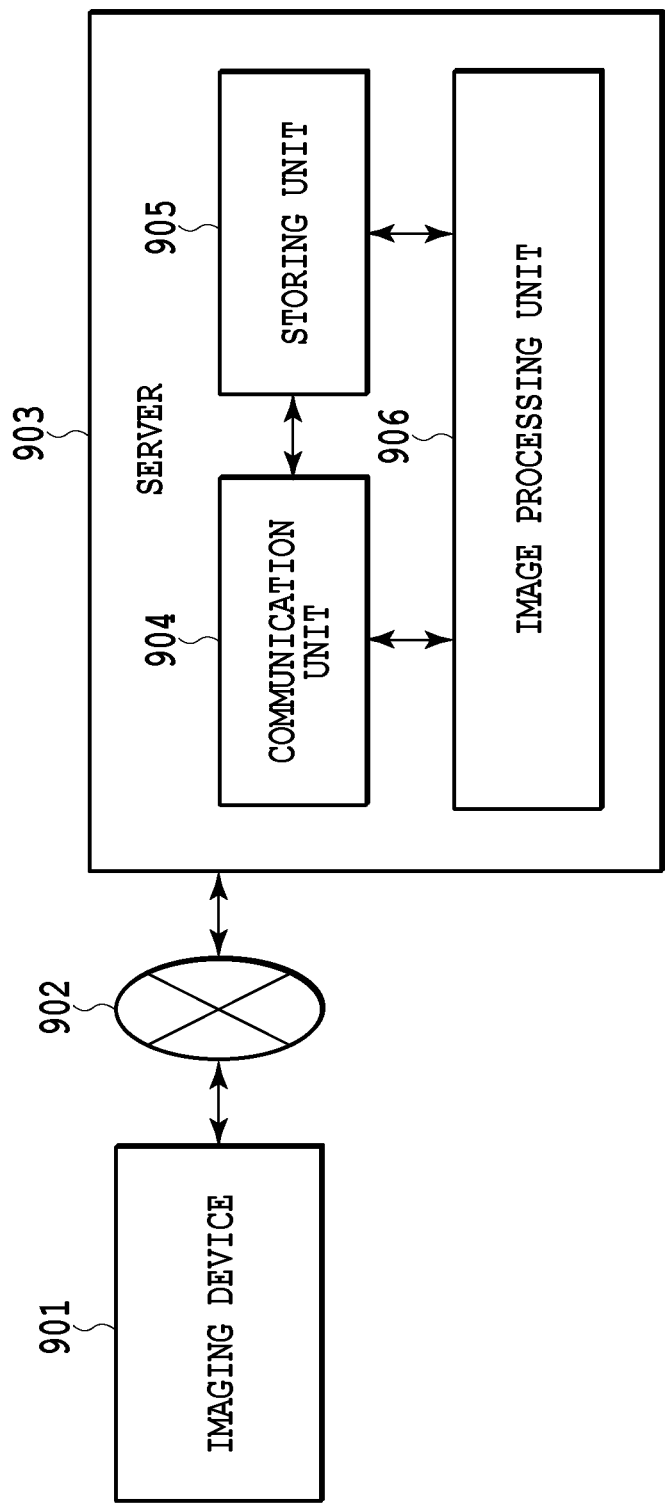
FIG. 9 is a block diagram of a wireless imaging system of Embodiment 3.
Figure 10:
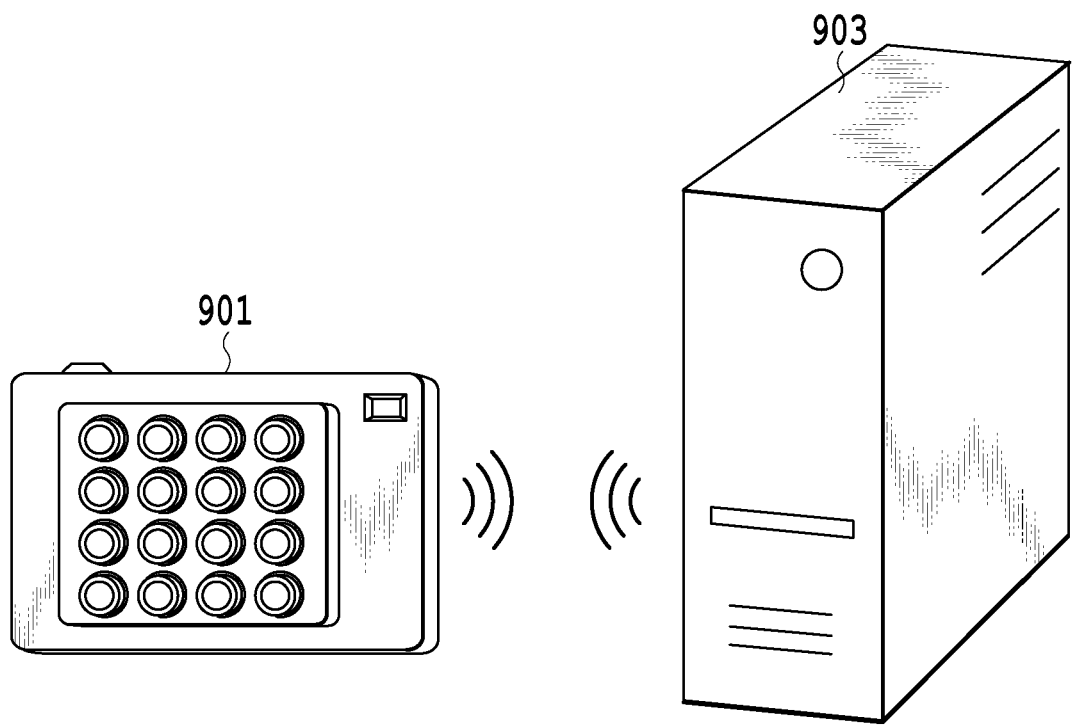
FIG. 10 is an appearance diagram of the wireless imaging system of Embodiment 3.

An explanation will be made on a wireless imaging system to which an image processing method of Embodiment 3 is applied. The feature of the present embodiment is that an imaging device transmits an image to a device wirelessly connected to the imaging device and that the device to which the image is wirelessly transmitted performs noise reduction for the input image. FIG. 9 is a block diagram of a wireless imaging system of Embodiment 3. Further, FIG. 10 shows the appearance of the configuration of the wireless imaging system of Embodiment 3.

A server 903 includes a communication unit 904, a storage unit 905, and an image processing unit 906, and is connected to an imaging device 901 via a network 902. In a case where the imaging device 901 performs photographing, the photographed image is automatically or manually transmitted and input to the server 903 and stored in the storage unit 905 as an input image. Thereafter, the image processing unit 906 performs noise reduction processing on the input image to generate an output image. The output image is output to the imaging device 901 or stored in the storage unit 905.

Figure 11:
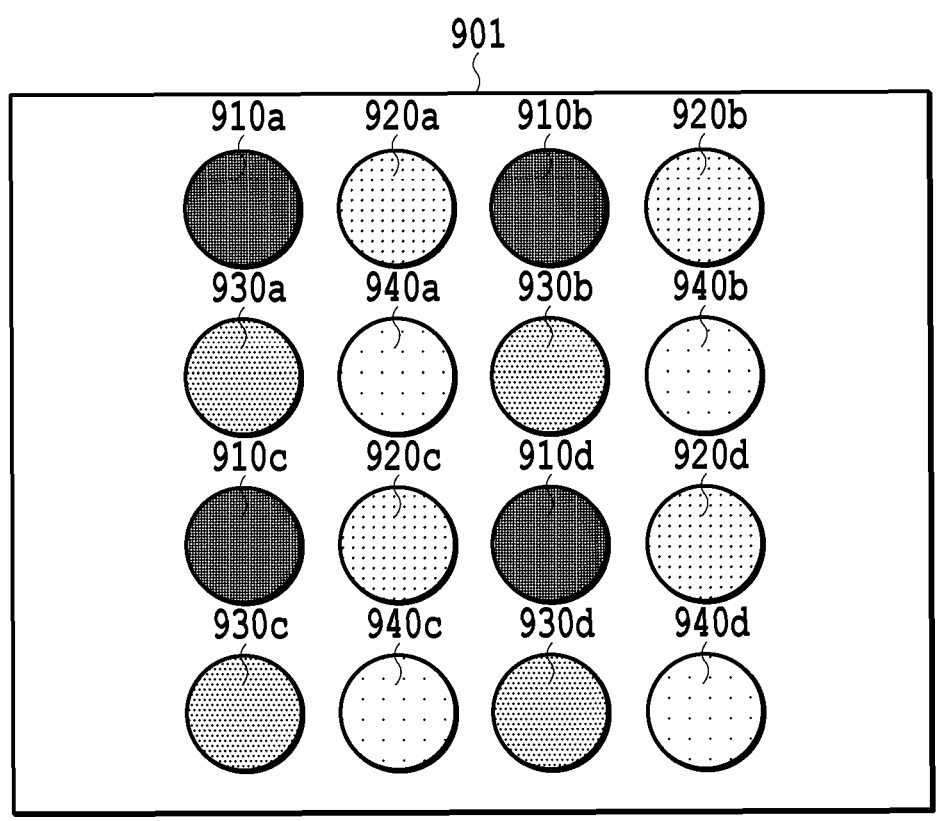
FIG. 11 is a view showing the configuration of an imaging device of Embodiment 3.

The imaging device 901 has a multiple-eye configuration, and as shown in FIG. 11, four types of imaging optical systems are arranged and four imaging optical systems are provided for each type. A focal distance varies depending on the type of imaging optical system. Imaging optical systems 910a to 910d are wide-angle lenses. Imaging optical systems 920a to 920d are standard lenses. Imaging optical systems 930a to 930d are middle telephoto lenses. Imaging optical systems 940a to 940d are telephoto lenses. However, the types, number, and arrangement of the imaging optical systems are not limited to those of the example shown in FIG. 11. Further, imaging elements corresponding to imaging optical systems may have different numbers of pixels.

A processing flow for the image processing unit 906 of the present embodiment is as shown in FIG. 3. Accordingly, an explanation of a feature similar to that of Embodiment 1 is omitted in the following explanation, and a feature different from that of Embodiment 1 will be described.

In step S301, the input image obtaining unit 103-1 obtains, as an input image, an image corresponding to one imaging optical system from images photographed by the imaging device 901.

In step S303, the reference data obtaining unit 103-3 obtains reference data. On this occasion, the reference data is obtained not only from the input image, but also from an image obtained by another imaging optical system of the imaging device 901. The imaging optical systems of the imaging device 901 all image a common subject with different viewpoints and image angles. Accordingly, in a case where there is reference data having high similarity to the target data, a corresponding partial region is obtained from images obtained by the other imaging optical systems, whereby the effect of noise reduction can be enhanced.

The above configuration can provide a wireless imaging system having the large effect of noise reduction while suppressing an increase in calculation load.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-077677, filed Apr. 4, 2014, which is hereby incorporated by reference wherein in its entirety.

What is claimed is:

1. An image processing device comprising:
   a target data extracting unit configured to extract, as target data, a set of signal values of pixels included in a target region including a target pixel in an input image;
   a reference data obtaining unit configured to obtain, as reference data for each of a plurality of reference pixels corresponding to the target pixel, a set of signal values of pixels included in a reference region including the reference pixel;
   a transformation reference data generating unit configured to generate transformation reference data from the reference data and output a plurality of signal values of transformation reference pixels which the generated transformation reference data has;
   a weight determining unit configured to determine a weight for each of the plurality of transformation reference pixels based on the target data and the reference data; and
   a unit configured to generate an output pixel corresponding to the target pixel by using a signal value calculated based on the transformation reference pixels and the weights,
   wherein the transformation reference data generating unit generates the transformation reference data by transforming the reference data in which a number of the pixels included in the reference region is larger than a number of the pixels included in the target region based on the number of the pixels included in the target region and the number of the pixels included in the reference region.

2. The image processing device according to claim 1, further comprising: a calculating unit configured to calculate a correlation value indicating similarity between the target data and the reference data for each of the plurality of reference pixels.

3. The image processing device according to claim 1, wherein the transformation reference data generating unit performs transformation so that the number of the pixels included in the reference region is equal to the number of the pixels included in the target region.

4. The image processing device according to claim 1, wherein the weight is determined based on the number of the pixels included in the reference region.

5. The image processing device according to claim 2, wherein the reference data includes first reference data and second reference data, in a case where a correlation value for the first reference data is equal to a correlation value for the second reference data and a number of pixels in the second reference data is larger than a number of pixels in the first reference data, a weight based on the second reference data is larger than a weight based on the first reference data.

6. The image processing device according to claim 1, wherein a number of pixels in each of at least one piece of the reference data out of a plurality of pieces of the reference data is larger than a number of pixels in the target data.

7. The image processing device according to claim 1, wherein not less than half of a plurality of pieces of the reference data have pixels larger in number than pixels in the target data.

8. The image processing device according to claim 7, wherein any of the plurality of pieces of the reference data has pixels larger in number than the pixels in the target data.

9. The image processing device according to claim 1, wherein after the transformation reference data generating unit makes a number of pixels in each of a plurality of pieces of the reference data equal to a number of pixels in the target data, the correlation value is calculated.

10. The image processing device according to claim 1, further comprising a unit configured to determine a level of noise reduction to be performed on the input image,
    wherein a range of a number of pixels which the reference data can have is determined based on the level.

11. An image processing system comprising:
    an imaging device for obtaining an input image; and
    an image processing device connected to the imaging device and generating an output image from the obtained input image,
    where the image processing device comprises:
    a target data extracting unit configured to extract, as target data, a set of signal values of pixels included in a target region including a target pixel in an input image;
    a reference data obtaining unit configured to obtain, as reference data for each of a plurality of reference pixels corresponding to the target pixel, a set of signal values of pixels included in a reference region including the reference pixel;
    a transformation reference data generating unit configured to generate transformation reference data from the reference data and output a plurality of signal values of transformation reference pixels which the generated transformation reference data has;
    a weight determining unit configured to determine a weight for each of the plurality of transformation reference pixels based on the target data and the reference data; and
    a unit configured to generate an output pixel corresponding to the target pixel by using a signal value calculated based on the transformation reference pixels and the weights,
    wherein the transformation reference data generating unit generates the transformation reference data by transforming the reference data in which a number of the pixels included in the reference region is larger than a number of the pixels included in the target region based on the number of the pixels included in the target region and the number of the pixels included in the reference region.

12. The image processing system according to claim 11, wherein the imaging device has a multiple-eye configuration having a plurality of imaging optical systems.

13. An image processing method comprising:
a target data extracting step of extracting, as target data, a set of signal values of pixels included in a target region including a target pixel in an input image;
a reference data obtaining step of obtaining, as reference data for each of a plurality of reference pixels corresponding to the target pixel, a set of signal values of pixels included in a reference region including the reference pixel;
a transformation reference data generating step of generating transformation reference data from the reference data and outputting a plurality of signal values of transformation reference pixels which the generated transformation reference data has;
a weight determining step of determining a weight for each of the plurality of transformation reference pixels based on the target data and the reference data; and
a step of generating an output pixel corresponding to the target pixel by using a signal value calculated based on the transformation reference pixels and the weights,
wherein in the transformation reference data generating step, the transformation reference data is generated by transforming the reference data in which a number of the pixels included in the reference region is larger than a number of the pixels included in the target region based on the number of the pixels included in the target region and the number of the pixels included in the reference region.

14. A non-transitory computer readable storage medium storing a program for causing a computer to function as an image processing device,
where the image processing device comprises:
a target data extracting unit configured to extract, as target data, a set of signal values of pixels included in a target region including a target pixel in an input image;
a reference data obtaining unit configured to obtain, as reference data for each of a plurality of reference pixels corresponding to the target pixel, a set of signal values of pixels included in a reference region including the reference pixel;
a transformation reference data generating unit configured to generate transformation reference data from the reference data and output a plurality of signal values of transformation reference pixels which the generated transformation reference data has;
a weight determining unit configured to determine a weight for each of the plurality of transformation reference pixels based on the target data and the reference data; and
a unit configured to generate an output pixel corresponding to the target pixel by using a signal value calculated based on the transformation reference pixels and the weights,
wherein the transformation reference data generating unit generates the transformation reference data by transforming the reference data in which a number of the pixels included in the reference region is larger than a number of the pixels included in the target region based on the number of the pixels included in the target region and the number of the pixels included in the reference region.

* * * * *